Patented Oct. 4, 1938

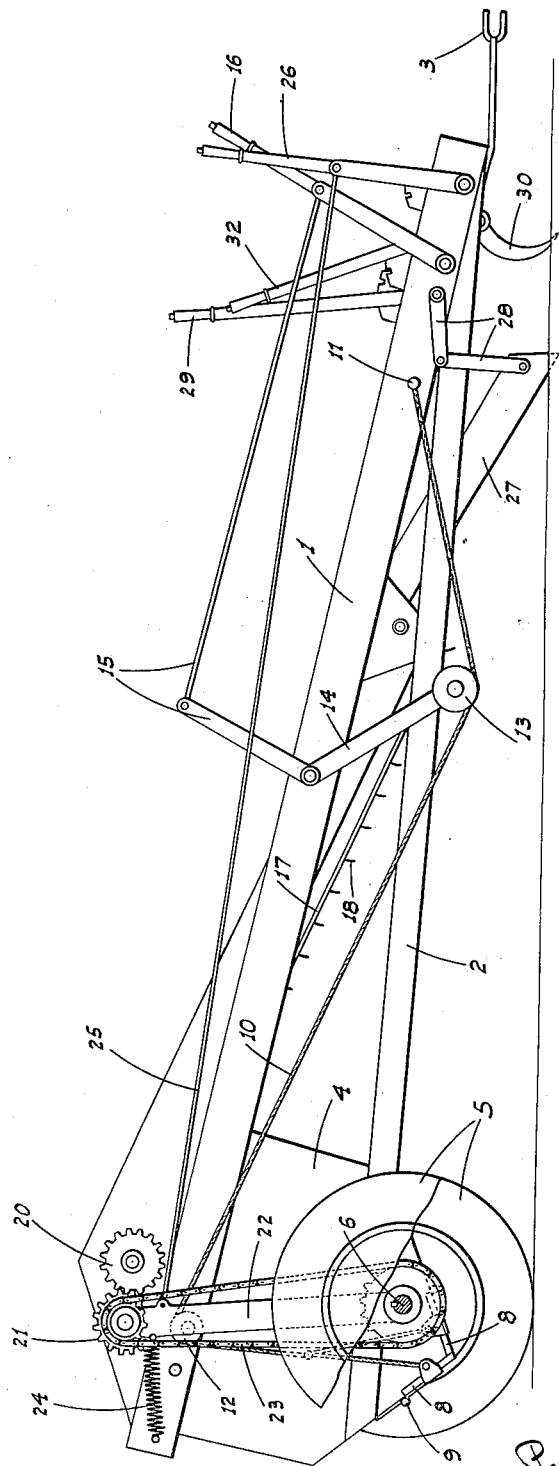

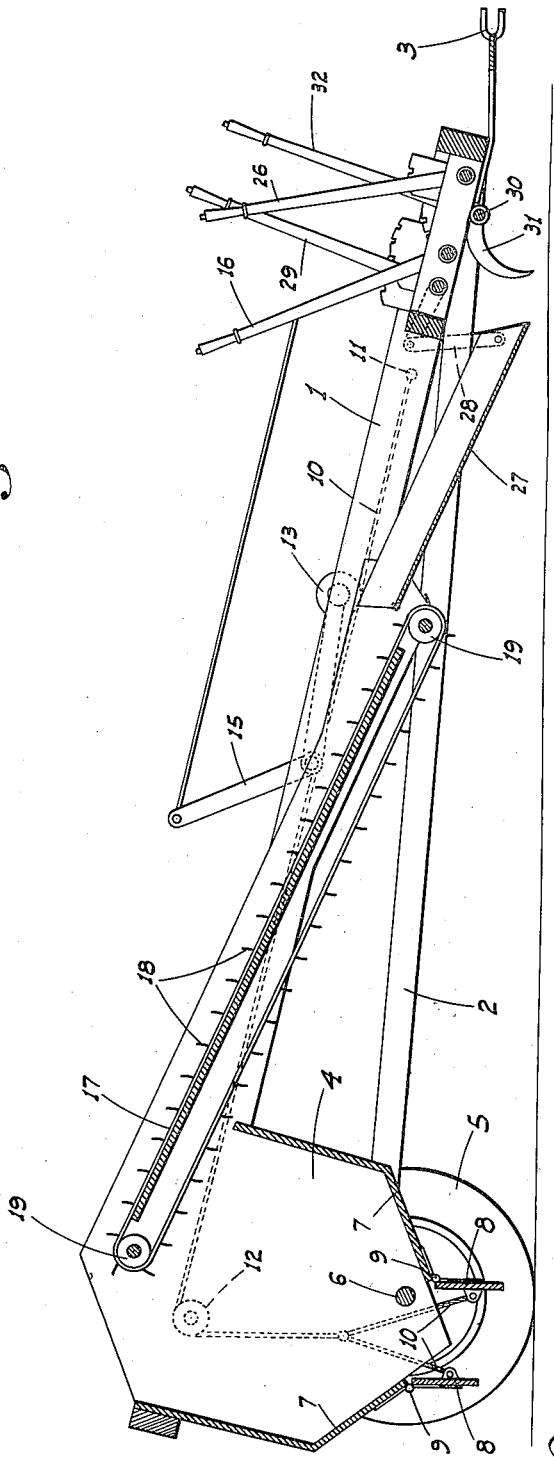

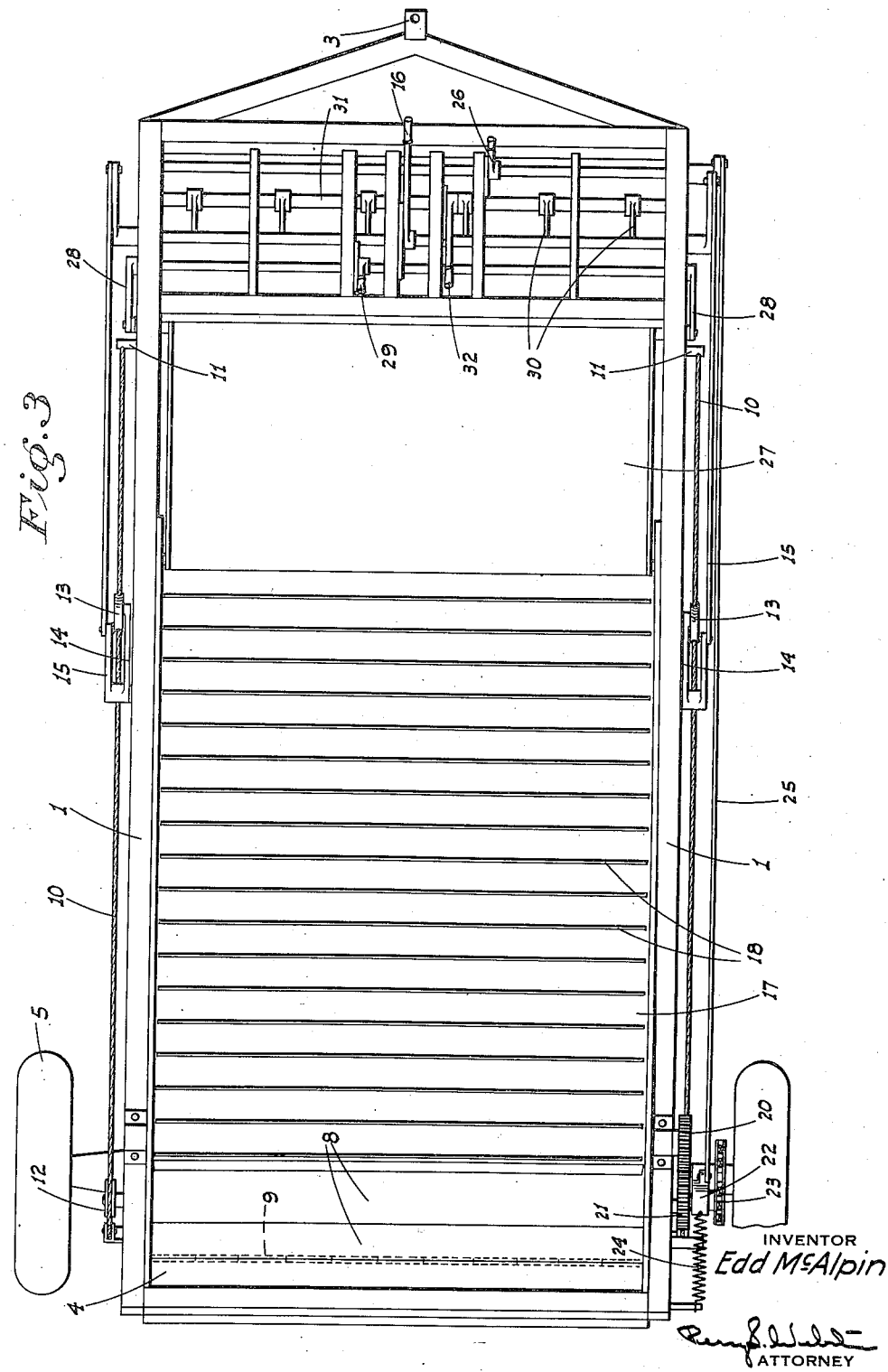

2,131,961

UNITED STATES PATENT OFFICE 2,131,961

CARRIER SCRAPER

Edd McAlpin, Lathrop, Calif.

Application January 30, 1937, Serial No. 123,186

2 Claims. (Cl. 37—8)

This invention relates to dirt transporting scrapers, my principal object being to provide a scraper of this character in which a large load may be scraped and carried without the heavy resistance usually set up, as the scraper fills, by the dirt already scraped and loaded. As a result of my improved features of construction, my scraper is very easy running and requires a minimum of power for its operation, whether light or loaded.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the scraper in a scraping position.

Figure 2 is a sectional elevation of the scraper in the dumping position.

Figure 3 is a top plan view of the same.

Referring now more particularly to the characters of reference on the drawings, the frame of the scraper comprises long rigid main side beams 1 having a downward slant to their forward end, and side brace beams 2. A rigid clevis 3 or the like is mounted on and projects from the front end of the frame for supporting connection to a tractor, the frame at said end being the same height from the ground as the drawbar of the ordinary tractor.

Rigid with and depending from the beams 1 at their rear end is a dirt carrying body 4, of greater extent transversely than longitudinally and supported at its sides by wheels 5, the axle 6 of which may project through the body. The wheels may be single (as shown), dual or in tandem, as the size of the body may require for its proper support. The bottom members 7 of the body slope downwardly in a plane lengthwise of the scraper in converging relation to each other, the lower portions of which are in the form of downwardly opening doors 8 hinged as at 9 along their upper edge on the members 7.

The opening and closing of these doors is manually controlled by means of longitudinally extending cables 10 on opposite sides of the frame and secured at their forward ends on beams 1 at their forward end as at 11. The cables then extend rearwardly on the outside of the body and beams to and over pulleys 12 on beams 1 directly above the doors 8. Below the pulleys, the cables branch and their lower ends are connected to the doors as shown. The cables are engaged intermediate their ends by rollers 13 which are mounted on the outer ends of arms 14 pivoted on the beams 1 intermediate their ends. These arms are swung at the option of the operator by suitable operating connections 15 with a lever 16 mounted on the frame adjacent its forward end. The length of the cables is such that when the doors are closed the cables are deflected considerably out of a straight line, and are held taut in such deflected position by the rollers 13. The arms 14 are then relatively lowered as shown in Fig. 1, so that when they are raised by manipulation of the lever 16, the cables may assume a straight line position. This of course allows the doors to swing open of their own weight or by the weight of the load in the body as shown in Fig. 2. The extent of opening movement of the doors is governed by the extent to which the arms 14 are raised, as will be evident, and this determines the speed of discharge of the dirt from the body.

Supported from and between the beams 1 and extending forwardly and downwardly from overhanging relation to the body is an endless conveyor belt 17 having transverse cleats or buckets 18 thereon. The belt is mounted on end spools 19, the upper one of which has a gear 20 secured therewith outwardly of the frame. This gear is positioned to mesh with another gear 21 mounted on the upper end of an arm 22 swingably mounted on axle 6. A chain drive 23 between the axle and gear 21 rotates the latter in the same direction as the axle and wheels so that gear 20 is turned in the reverse direction and the upper run of the conveyor moves rearwardly. A spring 24 acts on arm 22 to pull gear 21 out of mesh with gear 20. To pull the arm to a gear meshing position, it is connected by a reach rod 25 with a lever 26 mounted on the frame adjacent its forward end.

Pivoted at its rear end on the beams 1 in overhanging relation to the forward end of the conveyor is a scoop and blade unit 27. This is adapted to depend into the ground at its forward end to scrape up the dirt and feed the same on to the adjacent end of the conveyor for its full width. The scraping depth of the blade or its clearance from the ground for transportation is controlled by suitable linkage and arm connections 28 with a lever 29 mounted on the frame.

As another feature to aid in easy scraping I mount a row of scarifier teeth 30 just in front of the scoop. These are fixed on a shaft 31 journalled in the frame whose rotation, to place the teeth into or out of operating position, is controlled by a lever 32.

It is here to be noted that all the levers are operable independently of each other but are positioned adjacent each other and so that they are all convenient to the operator of the tractor to which the scraper is attached. Also pawl and quadrant devices of common character are associated with the different levers so that said levers and consequently the mechanisms or parts controlled thereby may be held in any certain position. It is also to be understood that any other control devices, the equivalent of the levers and connections shown, may of course be used instead of the construction features shown and above described. It will be seen that comparatively little dirt is in position on the scraper at any time to offer resistance to dirt being scraped, since as said dirt moves up the scoop 22 in the form of a relatively thin layer, it is delivered onto the constantly driven conveyor and carried thereby into the body at the rear of the implement. This body being directly over the wheels the load is carried without any tendency to bear down on the tractor with a pressure such as would make the latter hard to handle. The body may have great capacity, since its size does not affect the dirt in the scoop as will be obvious and much less power is needed to pull a load on wheels than one which must be pushed bodily back as the scraper advances. Also, the height of the body from the ground may be as great as may be necessary to obtain the desired capacity and clearance from the ground, since by the provision of the intermediate conveyor, the distance which the dirt has to be pushed up from the ground by the advancing of the machine, may be kept very low.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper comprising a frame, wheels supporting the frame, a dirt carrying body mounted on the frame, a scraping blade mounted on the frame ahead of the body, an endless conveyor mounted on the frame to receive dirt as scraped up by the blade and deliver the same to the body, rotary members on which the conveyor is mounted, a gear fixed with the rear member, another gear to mesh with said first gear, an arm on which said other gear is supported swingably mounted concentric with one of the wheels, means to drive said other gear from the wheel in the same direction, the axes of the gears lying in a line substantially at right angles to the arm, and means acting on the arm to swing the same to place the gear thereon into or out of mesh with the first named gear.

2. A scraper comprising a frame, wheels supporting the frame, a dirt carrying body mounted on the frame, a scraping blade mounted on the frame ahead of the body, an endless conveyor mounted on the frame to receive dirt as scraped up by the blade and deliver the same to the body, rotary members on which the conveyor is mounted, a gear fixed with the rear member, another gear to mesh with said first gear, an arm on which said other gear is supported swingably mounted concentric with one of the wheels, means to drive said other gear from the wheel in the same direction, the axes of the gears lying in a line substantially at right angles to the arm, a spring acting on the arm to swing the same in one direction, and manual means to swing the arm in the opposite direction against the resistance of the spring.

EDD McALPIN.